Oct. 3, 1950 — L. E. SHAW — 2,524,575
VARIABLE SPEED POWER TRANSMISSION
Filed Oct. 30, 1946 — 6 Sheets-Sheet 1

LOUIS E. SHAW
INVENTOR.

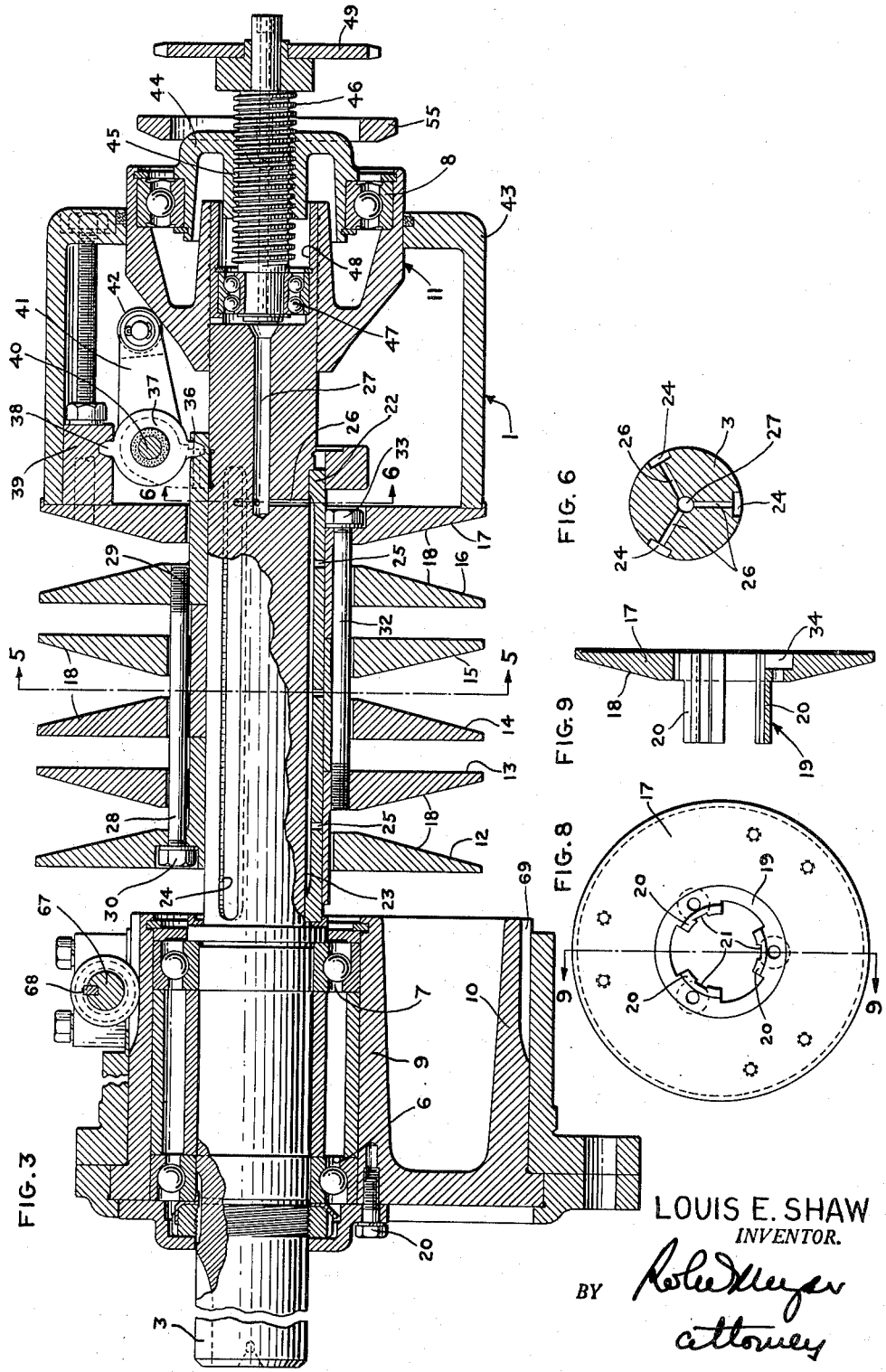

Oct. 3, 1950        L. E. SHAW        2,524,575
VARIABLE SPEED POWER TRANSMISSION
Filed Oct. 30, 1946        6 Sheets-Sheet 3
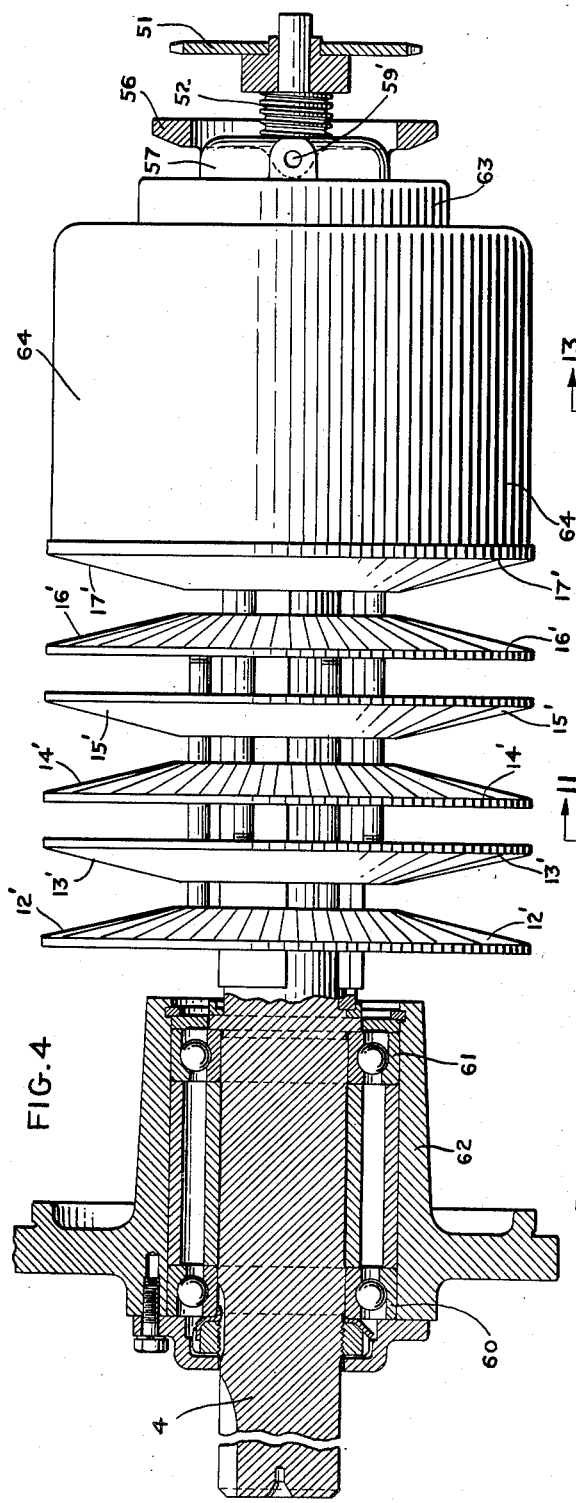
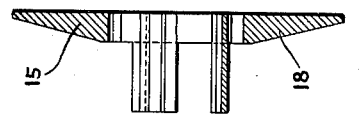
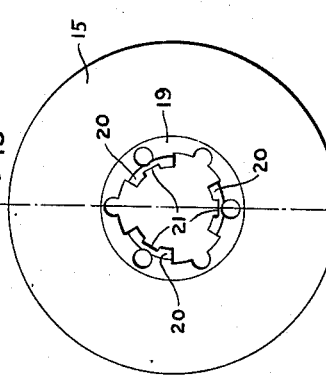
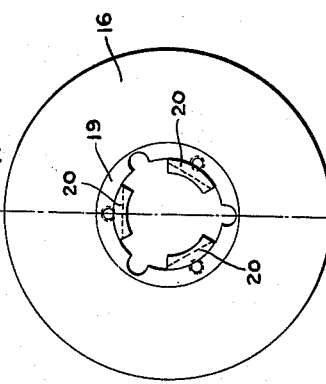
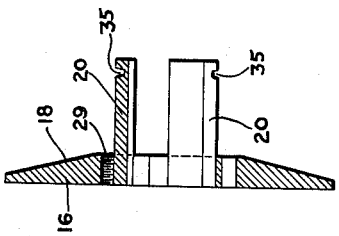
LOUIS E. SHAW
*INVENTOR.*
BY *[signature]*
*attorney*

Oct. 3, 1950     L. E. SHAW     2,524,575
VARIABLE SPEED POWER TRANSMISSION

Filed Oct. 30, 1946     6 Sheets—Sheet 4

LOUIS E. SHAW
INVENTOR.

BY *Robert Meyer*
*attorney*

Oct. 3, 1950 — L. E. SHAW — 2,524,575
VARIABLE SPEED POWER TRANSMISSION
Filed Oct. 30, 1946 — 6 Sheets-Sheet 5

LOUIS E. SHAW
INVENTOR.
BY
ATTORNEY

Oct. 3, 1950      L. E. SHAW      2,524,575
VARIABLE SPEED POWER TRANSMISSION
Filed Oct. 30, 1946      6 Sheets-Sheet 6

LOUIS E. SHAW
INVENTOR.

Patented Oct. 3, 1950

2,524,575

UNITED STATES PATENT OFFICE 2,524,575

VARIABLE SPEED POWER TRANSMISSION

Louis Eaton Shaw, Newark, N. J.

Application October 30, 1946, Serial No. 706,553

12 Claims. (Cl. 74—230.17)

This invention relates to variable speed power transmissions, and more particularly to a variable pitch, single or multiple-groove V-type sheave and the mechanism by means of which its pitch diameter may be varied while in operation.

An object of the present invention is the provision of a multiple belt variable speed transmission mechanism wherein the sheaves are mounted upon driving and driven shafts having fixed axes in which a great range of speed variations is provided without requiring movement of the driving shaft and its driving motor and wherein the pitch diameters of the driving and driven sheave or sheaves are varied inversely without sidewise shifting of the belts with the consequent excessive wear, friction and deteriorating heat action on the belts.

Another object of the present invention is to provide a variable speed power transmission as specified wherein the side thrust of the belts on various parts of the mechanism is materially reduced over that in well known transmission mechanisms of this type.

A further object of the invention is to provide in a variable speed transmission a structure which will permit removal or replacement of the driving belts without requiring dismantling of the mechanism.

A still further object of the present invention is to provide a novel construction of sheave, wherein the flanges of the sheaves are formed integrally with digitated sleeves that intermesh in pairs and bear directly on the shaft, with the sleeves of one of the flanges of each co-operating pair keyed loosely to the shaft to prevent relative rotation but permit free axial shifting while the sleeves of the other flanges are not keyed to the shaft but are driven from the keyed sleeves through the digitations.

With these and other objects in view, as may appear from the accompanying specification, the invention consists of various features of construction and combination of parts, which will be first described in connection with the accompanying drawings, showing a variable speed power transmission of a preferred form embodying the invention, and the features forming the invention will be specifically pointed out in the claims.

In the drawings:

Figure 3 is a longitudinal section through the input or driving assembly of the variable speed drive and taken on the line 3—3 of Figure 2.

Figure 4 is a view partly in longitudinal section and partly in elevation of the output or driven assembly of the drive and taken on line 4—4 of Figure 1.

Figure 6 is a detail cross-section through the driving or input shaft taken on the line 6—6 of Figure 3.

Figure 8 is an elevation of the first of the sheave flanges in the assembly.

Figure 9 is a cross-section taken on line 9—9 of Figure 8.

Figure 10 is an elevation of the motivating sheave flange.

Figure 11 is a cross-section through the motivating sheave flange and taken on line 11—11 of Figure 10.

Figure 12 is an elevation of an intermediate sheave flange of the assembly.

Figure 13 is a cross-section taken on line 13—13 of Figure 12.

The variable speed multiple belt drive of the present invention is of the type wherein sheaves are used in pairs on shafts having fixed centers, with the pitch diameters of the two sheaves (one a driving sheave and the other a driven sheave) varied inversely thereby providing a relatively great speed range. Also in the present invention the pairs of sheaves etc. are mounted in a housing forming a complete variable speed power transmission.

Before giving a specific description of the present invention, it is pointed out, for purposes of clearer understanding of the invention, that whenever two variable pitch sheaves, coupled for inverse operation are mounted on fixed centers and connected by a belt of constant length, the greatest possible distance between the centers obtains when the sheaves are both adjusted to the same pitch diameter. Then if the pitch diameter of one of them is increased by a given amount, the pitch diameter of the other must be decreased by a greater amount if the belt tension is to be kept constant.

Figure 22:
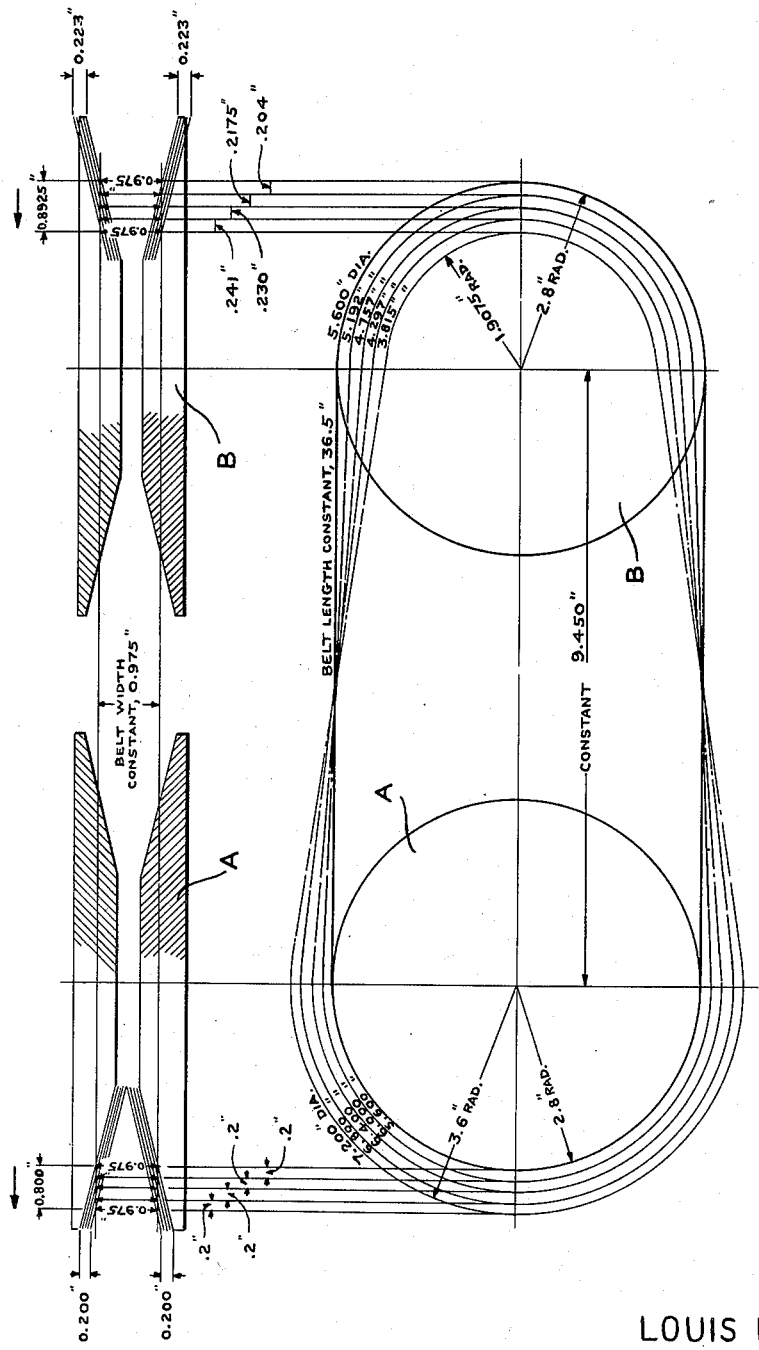
Figure 22 is a diagrammatic view showing the variances of pitch diameters of a pair of sheaves coupled in the drive for inverse operation on fixed axial centers.

This is clearly shown in Figure 22 of the drawings. In this Figure 22 the belt is shown in full line passing over each sheave of the pair at a radius of 2.8" and by broken lines at other radii. In variation of the pitch diameters of the two sheaves it will be noted that whereas the radius of the left hand sheave, namely the sheave A increases by increments of 0.2" the corresponding increments of the right hand sheave B are not only greater but increasingly greater as the radius is reduced.

Without going into details of the calculations necessary to prove the above, starting from the 1:1 point shown in solid line in Figure 22, if the flanges of the sheave A are moved closer together until the belt runs thereon at a radius of 3.6" (a radial movement outward of 0.8"), it will be necessary to separate or spread the flanges of the sheave B until the belt runs thereon at a radius of 1.9075 (a radial movement inward of 0.8925).

The mechanism hereinafter described specifically in connection with the drawings provides for this relative shifting of the flanges and since all of the flanges of the sheaves of the drive of the present invention are shiftable, there will be no sidewise shifting of the belts as occurs in variable speed drives wherein only one set of the flanges of either the driving or sheaves are shiftable, and further in the present drive mechanism the thrust against the bearings and threaded adjusting members of the drive is greatly reduced through the introduction of leverage between the speed adjusting means and the sheave flanges in comparison with those drives in which there is no such leverage.

Specifically describing the invention in connection with the accompanying drawings the improved variable speed drive comprises an input or driving assembly 1 and an output or driven assembly 2, the driving or input shaft 3 and the driven or output shaft 4 of which assemblies are parallel and mounted in the housing 5 to rotate on fixed axis during operation of the drive.

The power input or driving assembly 1 includes the driving shaft 3 which is driven from any suitable prime mover (not shown) and which is rotatably carried by bearings 6 and 7, mounted in the inner cylinder 9 of the eccentric cylinder 10, the purpose of which will be hereinafter described.

The shaft 3 has the sheave forming flanges 12, 13, 14, 15, 16 and 17 mounted thereon and arranged in opposed pairs with the angled face 18 of one flange facing the angled face of the adjacent flange to form the substantially V-shaped grooved sheaves over which the belts (not shown) travel.

All of the sheave flanges 12, 13, 14, 15, 16 and 17 have digitated sleeves 19 formed thereon that intermesh in pairs and bear directly on the shaft 3. Each sleeve 19 has three digitations 20 thereon and those of the flanges 15, 13, and 17 are provided with keyways 21 which receive keys 22 carried by the shaft 3 to prevent their rotation relative to the shaft but permit them to be freely shifted along the shaft.

The keys 22 are undercut for a part of their length as shown at 23 so as to form with the keyways 24, in the shaft, passages for flow of a lubricant which flows from such passages through openings 25 in the keys 22 to lubricate the inner surfaces of the digitated sleeves 19 of the various flanges where they engage the shaft 3. The lubricant is delivered to the passages formed by the keyways 24 and the undercut portions of the keys 22 through radiating passages 26 and a longitudinal passage 27 formed in the shaft 3.

The flanges 12, 14 and 16 are connected by bolts 28 which are threaded into the flange 16, as shown at 29, and have nuts 30 on their other ends which seat in counterbores 31 formed in the flange 12, while the flanges 13, 15, and 17 are connected by bolts 32 which are threaded into the flange 13 and have nuts 33 on their other ends which seat in counterbores 34 formed in the flange 17.

The digitations 20 of the sleeve 19 of the flange 16 have notches 35 cut in their outer surfaces near their outer ends and one of these notches receives therein the tooth 36 of the two toothed shifting gear 37.

The tooth 38 of the gear 37 engages in a notch formed in the block 39 which is carried by the flange 17. The teeth 36 and 38 are disposed diametrically opposite of each other, as is clearly shown in Figure 3 of the drawings so that when the gear 37 is rotated the flange 17 and the flanges 15 and 13 will move in one direction while the flange 16 and the flanges 14 and 12 will move in the opposite direction. Thus all of the flanges making up the sheaves will move simultaneously with the opposing flanges moving towards or from each other to vary the pitch diameters of the sheaves formed by the pairs of opposing flanges.

The gear 37 is mounted upon a stub shaft 40 for limited rotary movement thereon, and it has an arm 41 connected thereto. The arm 41 has a roller 42 rotatably carried by its free end and this roller rides on the inclined outer surface of the cone cam 11.

The cone cam 11 is slidably mounted on the end of the shaft 3 remote from the end to which the prime mover (not shown) is connected and it also is slidably supported by the housing 43 which encloses the major portion of the cone cam 11 the gear 37 etc., and as clearly shown in Figure 3 of the drawings.

A spider 44 is provided which together with the cone cam 11 carries the bearing 8 and this spider which is not connected to the cone cam 11 in any other manner has a threaded bore 45 which threadably receives an adjusting screw 46. The inner end of the adjusting screw 46 is rotatably supported by a bearing 47 which is carried by the shaft 3 in the longitudinal recess 48 formed in the end of the shaft 3, thus when the adjusting screw 46 is rotated the cone cam 11 will be moved longitudinally along the shaft 3.

The adjusting screw 46 has a sprocket 49 mounted on its outer end which is connected by a sprocket chain 50 to the sprocket 51 mounted on the outer end of the adjusting screw 52 of the output or driven assembly 2. A sprocket 53 engages the chain 50, and this sprocket 53 is rotated by a hand wheel 54 to rotate the sprockets 49 and 51 in unison and consequently rotate the adjusting screws 46 and 52 in unison.

Figure 1:
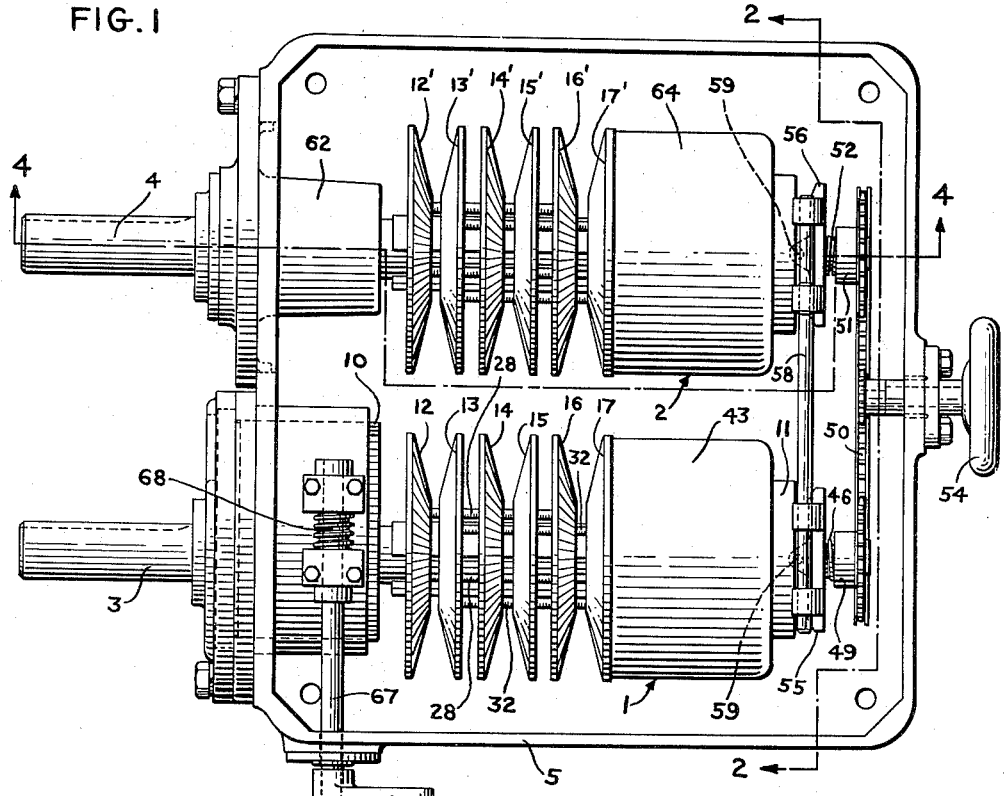
Figure 1 is a top plan of the improved variable speed drive.
Figure 2:
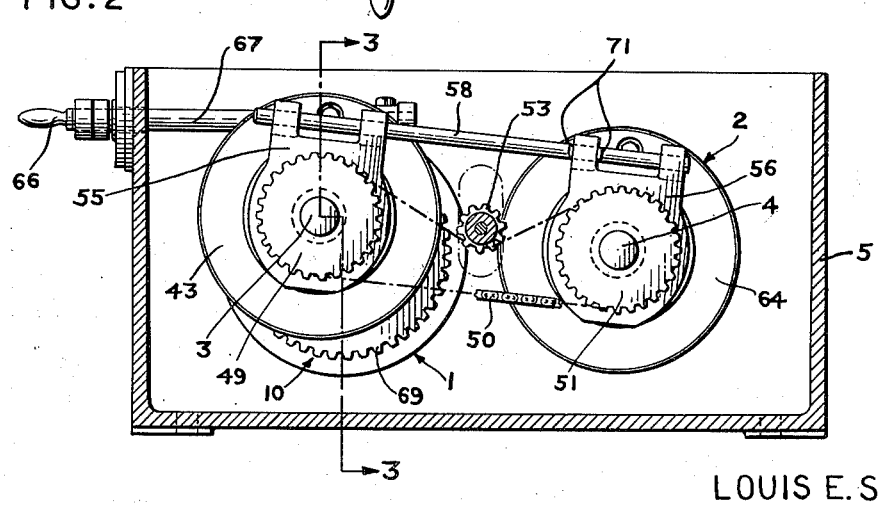
Figure 2 is a vertical section through the variable speed drive taken on the line 2—2 of Figure 1.
Figure 5:
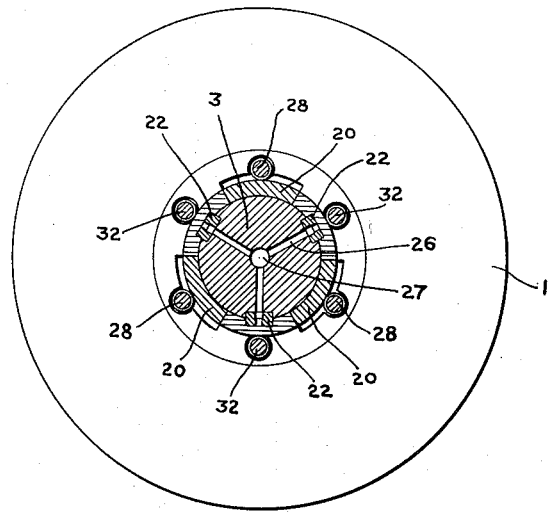
Figure 5 is a cross-section through the input or driving assembly of the drive and taken on the line 5—5 of Figure 3.
Figure 21:
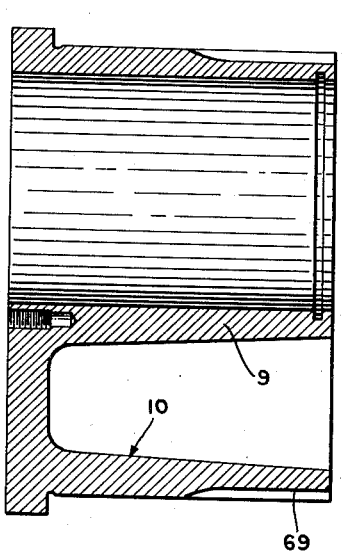
Figure 21 is a section taken on the line 21—21 of Figure 20.
Figure 20:
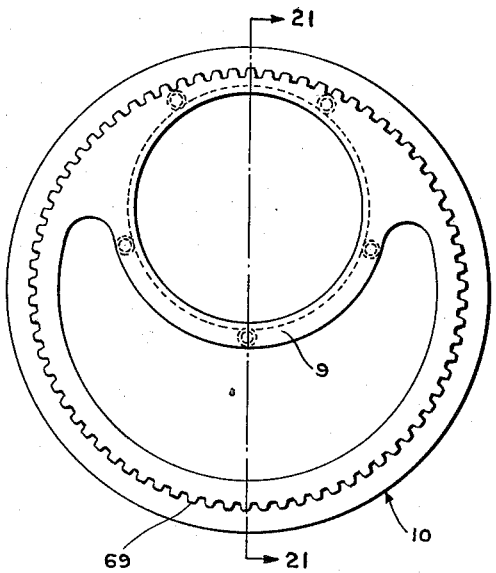
Figure 20 is an elevation of an eccentric adjusting cylinder employed in the drive to facilitate the removal or replacement of the belts.

Brackets 55 and 56 are attached as shown at 59 in Figure 1, respectively to the spider 44 and to the corresponding spider 57 of the output or driven assembly 2. The brackets 55 and 56 are connected by a rod 58.

The cone cam 11 revolves with the shaft and the housing 43, while the spider or nut 44 is held against rotation by trunnions 59 which engage in holes 59' in the spider.

The output or driven assembly 2 of the variable speed drive comprises the output or driven shaft 4 which is rotatably supported by suitable bearings 60 and 61 carried by the cylindrical housing 62.

While in the drawings only a part of the cone cam 63 is shown protruding from the housing 64 it is to be understood that the output or driven assembly includes mechanism or elements identical to those enclosed in the housing 43 of the input or driving assembly 1 to provide for the shifting of the flanges 12', 13', 14', 15', 16' and 17' which are embodied in the output assembly 2.

The flanges 12', 13', 14', 15', 16' and 17' are of the same construction as the corresponding flanges 12, 13, 14, 15, 16, and 17 having the same digitated sleeves and operate in the same manner, the opposed pairs co-operating to form sheaves which act as a sheave of a pair driven by a belt with the corresponding sheave of the driving or input element.

Figure 7:
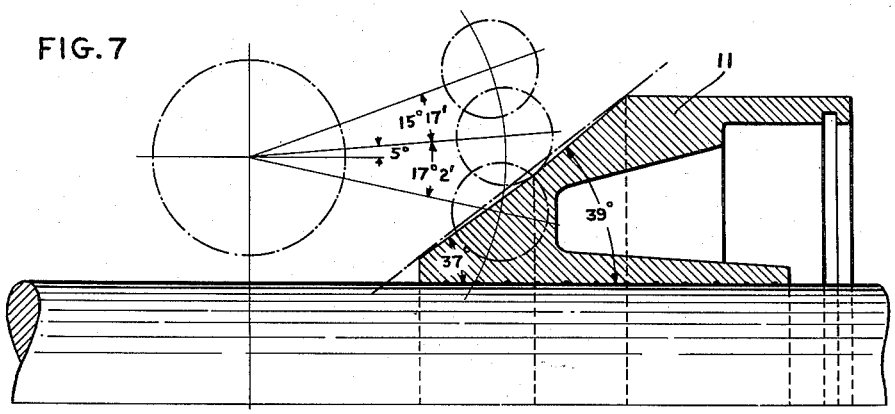
Figure 7 is a diagrammatic view partly in section showing the shifting cam for shifting the sheave sections.
Figure 15:
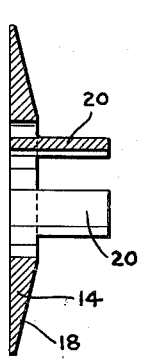
Figure 15 is a cross-section taken on line 15—15 of Figure 14.
Figure 14:
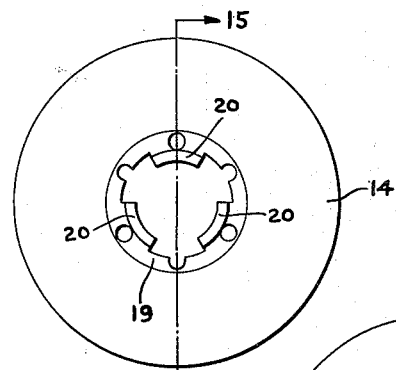
Figure 14 is an elevation of one of the intermediate sheave flanges of the assembly.
Figure 16:
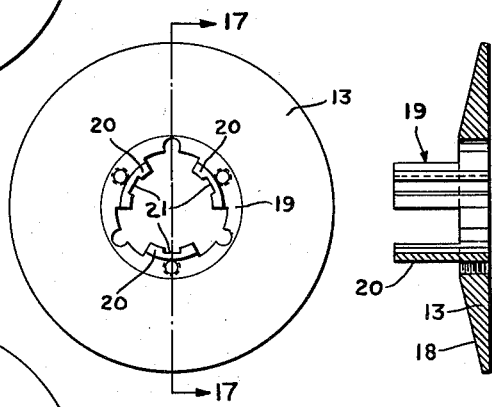
Figure 16 is an elevation of another of the intermediate sheave flanges of the assembly.
Figure 17:
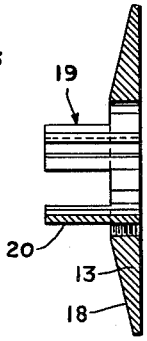
Figure 17 is a cross-section on line 17—17 of Figure 16.
Figures 18, 19:
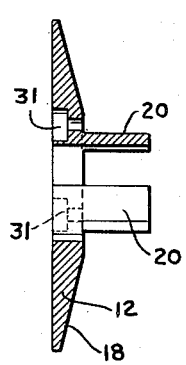
Figure 18 is a side elevation of the last sheave flange in the assembly.
Figure 19 is a cross-section on the line 19—19 of Figure 18.

To provide for the varying of the pitch diameters of the pairs of cooperating sheaves of the driving and driven assemblies as set out above in the specification the cam surface of the cone cam 11 is particularly formed as is shown in Figure 7 of the drawings. The angle of incline of the cam surface from the maximum diameter thereof to approximately the median diameter is cut or formed at an angle of a predetermined degree; shown as 39° in Figure 7, while the angle of incline of the cam face from approximately the median diameter to the minimum diameter is cut at a different angle of less degree, shown as 37° in Figure 7.

The cutting of the cam face at the angles of different degree, carefully calculated in accordance with the differences in the pitch diameters of the sheaves of a co-operating pair, will provide for the variance desired as set out on page 4 hereof, to maintain the belts under the proper tension at all adjustments of the flanges forming the sheaves.

Means are provided in the present invention to permit ready replacement of the belts of the drive without requiring the dismantling of the drive. This means comprises a manually operable crank handle 66 for rotating a rod 67 on which is mounted a worm 68. The worm 68 meshes with the teeth 69 on the perimeter of the eccentric cylinder 10 so that when the crank handle 66 is rotated the input shaft 3 will be moved towards or from the output shaft 4. The bracket 55 remote from the end mounted in the bearings slides freely on the rod 58, the latter being held by cotter pin 71 to the bracket 56.

When it is desired or necessary to remove or replace the belts of the drive, or any of them, the crank handle 66 is rotated in the proper direction, which in turn rotates the eccentric cylinder 10 to move the shaft 3 towards the shaft 4. The sprocket chain 50 is then removed and the belts (not shown) may then be slipped off over the inner ends of the shafts 3 and 4. After the belts have been removed and replaced by others, the chain 50 is again put in place on the sprockets 49 and 51 and the crank handle 66 rotated to move the shaft 3 away from the shaft 4 as far as necessary to give correct initial tension to the belts. This adjustment also permits the belts to be tightened from time to time to compensate for any stretching or wear that may have occurred. The thread angle of the worm 68 and of the teeth 69 is so slight that the sleeve or cylinder 10 will remain locked in any position of adjustment.

It will be understood that the invention is not to be limited to the specific construction or arrangement of parts shown, but that they may be widely modified within the invention defined by the claims.

What is claimed is:

1. In a variable speed power transmission, a power input shaft, a power output shaft, a plurality of digited sleeves mounted slidably on each of said shafts, sheave forming flanges on said sleeves and arranged in pairs to form sheaves on each shaft, the sheaves on the input shaft co-operating with corresponding sheaves on the output shaft, means for loosely keying one sleeve of each pair of flanges to its shaft for rotation therewith, the digitations on said keyed sleeves meshing with the digitations on the non-keyed sleeves whereby the non-keyed sleeves and their flanges will be rotated by rotation of the keyed sleeves, means for moving said sleeves and their flanges axially on their shafts to vary the pitch diameters of the sheaves, said sleeve and flange moving means including operating cams, said cams being movable along the axes of the shaft, means for operating said cams in unison, the operating surfaces of said cams being inclined and having the angle of incline from the maximum diameter to approximately the median diameter cut at a predetermined degree and the angle of incline from approximately the median diameter to the minimum diameter cut at an angle of lesser degree so that when one cam moves the flanges forming the sheaves on one shaft to increase the pitch diameters of the sheaves the other cam will move the sheave forming flanges of the sheaves on the second shaft to decrease their pitch diameters.

2. A variable speed power transmission as claimed in claim 1 embodying bearings for said power input shaft, cylinder eccentrically carrying said bearings, and means for rotating said cylinder about its axis to move said power input shaft towards or from said power output shaft.

3. A variable speed power transmission as claimed in claim 1 wherein the digitations of the sleeves of one of the pairs of flanges on each the power input and power output shafts are provided with notches therein, two toothed gears with their teeth engaging in said notches, means connected to said gears and said cams for rotating the gear upon movement of the cams to move the sleeves and their flanges axially of the shafts.

4. A variable speed drive as claimed in claim 1 wherein said cam operating means includes an operating spider rotatably connected to each of the cams for moving the cams axially, means for moving said spiders, and means connected to said spider moving means for moving the spiders in unison.

5. A variable speed drive as claimed in claim 1 wherein the cams are mounted on one end of each shaft, the ends of said shafts upon which said cams are mounted being hollow, and said cam operating means includes feed screws rotatably mounted in the hollow ends of the shafts, spiders mounted on said feed screws, means rotatably connecting said spiders to said cams for moving the cams axially on the shafts upon rotation of the feed screws.

6. A variable speed drive as claimed in claim 1 wherein the angled inclined operating surfaces of said cams have their longitudinal lines extending longitudinally of said shaft, cam rollers engaged against said inclined surfaces, pivoted arms carrying said cam rollers, and means connecting said pivoted arms and said sheave flanges for moving the flanges upon movement of the arms.

7. A variable speed drive as claimed in claim 1 wherein the cams are mounted on one end of each shaft, the ends of said shafts upon which said cams are mounted being hollow, an operating spider rotatably connected to each of said cams for moving the cams axially along said shafts, means carried by the hollow ends of said shafts for moving said spider, and means connected to said spider-moving means for moving the spiders in unison.

8. A variable speed drive as claimed in claim 1 wherein the cams are mounted on one end of each shaft, the ends of said shafts upon which said cams are mounted being hollow, an operating spider rotatably connected to each of said cams for moving the cams axially along said shafts, means carried by the hollow ends of said shafts for moving said spider, means connected to said spider-moving means for moving the spiders in unison, the angled inclined operating surfaces of said cams having their longitudinal lines extending longitudinally of said shaft, cam rollers engaged against said inclined surfaces, pivoted arms carrying said cam rollers, and means connecting said pivoted arms and said sheave flanges for moving the flanges upon movement of the arms.

9. A variable speed power transmission including a power input shaft, a power output shaft, a plurality of digited sleeves slidably mounted on each of said shafts, sheave-forming flanges on said sleeves and arranged in pairs to form sheaves on each shaft, the sheaves on the input shaft cooperating with corresponding sheaves on the output shaft, means for keying one sleeve of each pair of flanges to its shaft for rotation therewith, the digitations on said keyed sleeves meshing with the digitations on the non-keyed sleeves whereby the non-keyed sleeves and their flanges will be rotated by rotation of the keyed sleeves, means for moving said sleeves and their flanges axially on their shafts to vary the pitch diameter of the sheaves including cams slidably mounted for longitudinal movement on said shafts, the operating surfaces of said cams being inclined and having the angle of incline from the maximum diameter to approximately the median diameter cut at a predetemined degree and the angle of incline from approximately the median diameter to the minimum diameter cut at an angle of lesser degree, the degrees of the angles of incline of said angles of said lesser degree being regulated relative to the angles of incline of the other surfaces so that upon operation of the cams the pitch diameter of certain of the sheaves would be decreased in greater increments than the pitch diameter of the other sheaves so increased.

10. In a variable speed power transmission, a shaft, a sheave on said shaft comprising a pair of flanges movable towards or from each other to vary the pitch diameter of the sheave, a cam mounted on said shaft, means connecting said cam and flanges to move the flanges upon movement of the cam, the operating surface of said cam being inclined and having the angle of incline from the maximum diameter to approximately the median diameter cut at a predetermined degree and the angle of incline from approximately the median diameter to the minimum diameter cut at an angle of lesser degree, a spider rotatably connected to said cam, means for moving said spider longitudinally of said shaft to move said cam longitudinally of said shaft.

11. In a variable speed power transmission, a shaft, a sheave on said shaft comprising a pair of flanges movable towards or from each other to vary the pitch diameter of the sheave, a cam mounted on said shaft, means connecting said cam and flanges to move the flanges upon movement of the cam, the operating surface of said cam being inclined and having the angle of incline from the maximum diameter to approximately the median diameter cut at a predetermined degree and the angle of incline from approximately the median diameter to the minimum diameter cut at an angle of lesser degree, said shaft having one end hollow, a feed screw rotatably carried by said hollow end, a spider mounted on said feed screw for longitudinal movement of the spider upon rotation of the feed screw, and means rotatably connecting said spider and said cam.

12. In a variable speed power transmission, a shaft, a sheave on said shaft comprising a pair of flanges movable towards or from each other to vary the pitch diameter of the sheave, a cam mounted on said shaft, means connecting said cam and flanges to move the flanges upon movement of the cam, the operating surface of said cam being inclined and having the angle of incline from the maximum diameter to approximately the median diameter cut at a predetermined degree and the angle of incline from approximately the median diameter cut at an angle of lesser degree, the angled inclined operating surfaces of said cam having its longitudinal lines extending longitudinally of the shaft, said means connecting said cam and flanges to move the flanges including pivoted arms, cam rollers carried by said pivoted arms and engaging the inclined surfaces of said cam, and means connecting said pivoted arms and said sheave flanges.

LOUIS EATON SHAW.

REFERENCES CITED

The following references are of record in the file of this patent:

UNITED STATES PATENTS

| Number | Name | Date |
|---|---|---|
| 1,235,794 | Hardaker | Aug. 7, 1917 |
| 1,546,996 | Reeves | July 21, 1925 |
| 2,068,784 | Abbot | Jan. 26, 1937 |
| 2,101,084 | Meyers | Dec. 7, 1937 |
| 2,120,383 | Watson | June 14, 1938 |
| 2,158,047 | Weston | May 9, 1939 |
| 2,203,149 | Hoover | June 4, 1940 |
| 2,241,427 | Shields | May 13, 1941 |
| 2,248,949 | Bowers | July 15, 1941 |
| 2,348,994 | Otto | May 16, 1944 |
| 2,496,201 | Dodge | Jan. 31, 1950 |

FOREIGN PATENTS

| Number | Country | Date |
|---|---|---|
| 462,625 | Great Britain | Mar. 12, 1937 |